United States Patent Office 3,165,160
Patented Jan. 12, 1965

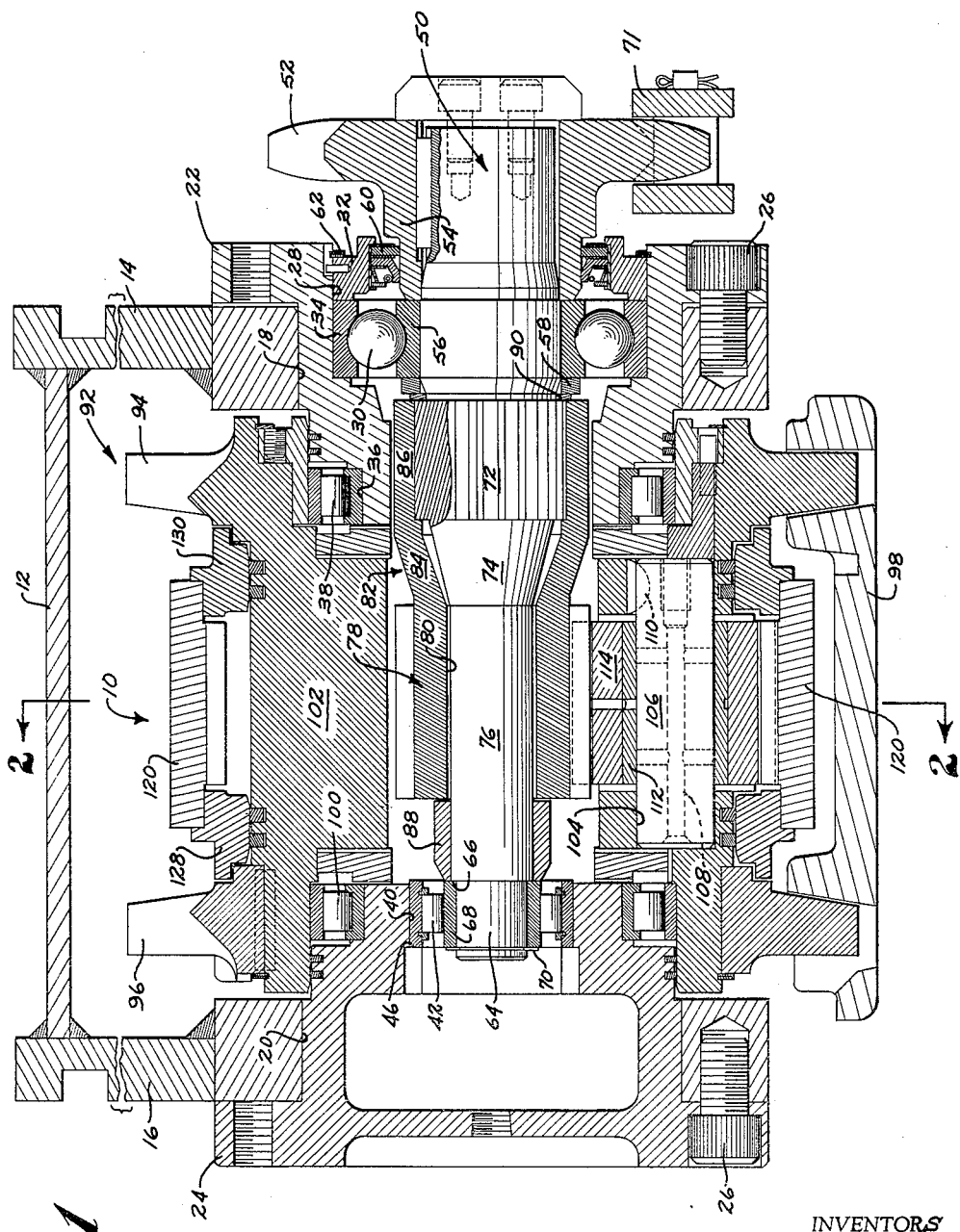

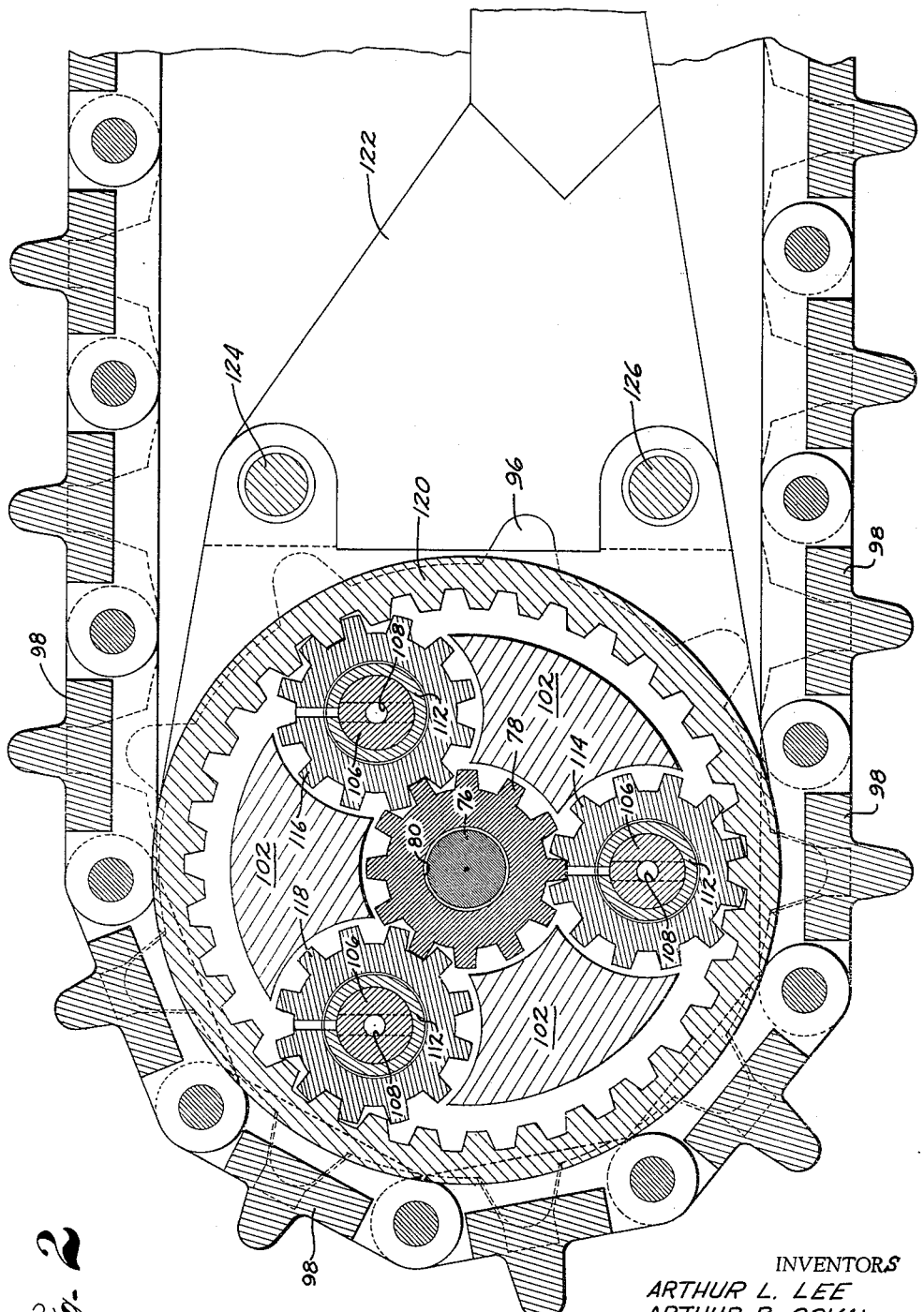

3,165,160
PLANETARY GEAR DRIVE FOR A
CRAWLER TREAD
Arthur L. Lee and Arthur B. Coval, Columbus, Ohio, assignors to Consolidation Coal Company, Pittsburgh, Pa., a corporation of Pennsylvania
Filed Aug. 30, 1962, Ser. No. 220,441
5 Claims. (Cl. 180—9.64)

This invention relates to a planetary gear type crawler tread drive mechanism and more particularly to a planetary gear type crawler tread drive mechanism where the gear loading is equally distributed among the planet gears.

This invention is an improvement of the drive mechanism disclosed in Patent #2,707,522, dated May 3, 1955 in the name of John R. Sibley and entitled "Crawler Tread Planetary Gear Drive."

In the above patent the drive mechanism drive shaft is journaled in a pair of bearing supports that are secured to and form a part of the vehicle frame. A sun gear is formed on the drive shaft and meshes with the planet gears. A driven sprocket is coaxially positioned on the drive shaft and carries the planet gears thereby forming a rotatable planet gear carrier. A crawler tread is propelled around the driven sprocket by the drive shaft transmitting rotation through the sun gear to the planet gears. An internally toothed ring gear meshes with the planet gears and is held against rotation by an arm secured to the ring gear and to the machine frame. In this type of drive mechanism the driving force required to propel the machine is transmitted to the planet gears from the sun gear and then to the planet carrier and crawler tread. To minimize the loading on the individual gear teeth it is essential that the driving force be distributed equally among the several planet gears. This problem was appreciated in the above patent and by providing a long lever arm to connect the ring gear to the machine frame, the patentee improved the distribution of the load on the planet gears during operation. It was also appreciated in this patent that a lever of infinite length is required to equally distribute the gear load among the several planet gears. The lever as described in the above patent improved the gear load distribution but did not provide equal gear load distribution. We have improved the drive mechanism disclosed in the above patent by providing another means for uniformly distributing the gear load among the planet gears and we thereby minimize gear failures due to overload on the gear teeth.

Briefly, our invention includes a sun gear that floats on the drive shaft and under load the sun gear assumes a common center with the planet gears that are radially disposed about the sun gear. With this arrangement there is an equal distribution of the gear load on all planet gears. The drive shaft is supported on roller bearings in the bearing supports on opposite sides of the sun gear and has an externally splined portion adjacent one of the roller bearings. The sun gear has a hub portion and an elongated annular flange extending from one side of the hub portion. The annular flange has an internally splined end portion. The spur gear is coaxially positioned on the drive shaft and the gear annular flange splined portion meshes with the splines of the drive shaft. The dimension of the spur gear bore is slightly larger than the outer dimension of the drive shaft so that the sun gear is supported on the drive shaft by the splined annular flange and the hub portion can deflect slightly relative to the shaft and seek a common center with the planet gears radially disposed therearound.

Accordingly, the principal object of this invention is to provide a planetary drive mechanism where the sun gear is movable radially relative to the drive shaft and under load assumes a common center with the planet gears that are radially disposed around the sun gear.

Another object of this invention is to provide a planetary drive mechanism with a sun gear that is driven by a coaxial drive shaft and is radially movable relative to the drive shaft to thereby equally distribute the gear load to all planet gears radially disposed around the sun gear.

These and other objects and advantages of this invention will be more completely described and distinctly pointed out in the following specification, the accompanying drawings and the appended claims.

In the drawings:

FIGURE 1 is a sectional view in front elevation showing our improved drive mechanism.

FIGURE 2 is a view in section taken along the line 2—2 in FIGURE 1.

The drive mechanism generally designated by the numeral 10 is mounted in a crawler frame 12 in a manner that the weight of the machine is supported by a portion of the drive mechanism 10. The frame 12 has a pair of depending spaced side members 14 and 16. The side members 14 and 16 have aligned transverse apertures 18 and 20 in which a pair of bearing supports 22 and 24 are positioned. The bearing supports 22 and 24 are secured to the side members 14 and 16 by means of bolts 26 and form an integral part of the frame 12. The bearing support 22 has a central bore 28 in which a ball bearing 30 is positioned. A bearing retainer 32 secures the outer race 34 of bearing 30 in fixed axial relation with the bearing support 22. The bearing support 22 has an annular inturned bearing receiving portion 36 on which a roller bearing 38 is positioned. The bearing support 24 has an internal bore 40 with an inwardly extending shoulder 46. A roller bearing 42 is positioned in the bore 40 with the outer race abutting the shoulder 46 to limit outward axial movement of the bearing 42 in bore 40.

A drive shaft 50 is supported within bearing supports 22 and 24 by roller bearings 30 and 42. The drive shaft 50 has a sprocket 52 secured thereto for driving the shaft 50. The sprocket 52 has an inwardly extending hub portion 54 which abuts the inner race 56 of bearing 30. An annular spacer 58 abuts the other side of bearing inner race 56 to maintain the bearing 30 in a preselected position relative to both the bearing support 22 and drive shaft 50. An annular dust seal 60 is positioned on the sprocket hub 54 and is fixedly secured to bearing support 22 by means of snap ring 62. The drive shaft 50 has an end portion 64 of reduced diameter which extends through and is supported by bearing 42 in bearing support 24. The drive shaft end portion 64 has a shoulder 66 against which the inner race 68 of bearing 42 abuts. A snap ring 70 maintains the bearing 42 in fixed axial relation to both the bearing support 24 and drive shaft 50. With this arrangement the drive shaft 50, driven by an endless chain 71, rotates in the bearing supports 22 and 24 with roller bearings 30 and 42 positioned between the drive shaft 50 and respective bearing supports 22 and 24.

The drive shaft 50 has an intermediate portion 72 with external splines formed thereon. Adjacent the intermediate portion 72 the shaft 50 has beveled or inwardly tapered portion 74 which terminates in a cylindrical portion 76. A sun gear 78 has a bore 80 and is coaxially positioned on the drive shaft cylindrical portion 76. The sun gear 78 has an annular flange 82 extending laterally therefrom. The annular flange 82 has an intermediate outwardly tapered portion 84 and a cylindrical end portion 86. The cylindrical end portion 86 has internal splines which mate with the splines on the shaft intermediate portion 72 to nonrotatably secure sun gear 78 to drive shaft 50. The diameter of the sun gear bore 80 is slightly larger than the diameter of shaft intermediate portion 76. Similarly the outwardly tapered portion 84 of annular flange 82 has an internal dimension slightly larger than the taper diameter of drive shaft portion tapered portion 74. The splined portion 72 outer diameter is substantially the same as the internal bore of the annular flange end portion 86. With this construction the sun gear 78 is supported on drive shaft 50 by means of the annular flange 86. In a static position where the sun gear is not exerting a driving force on the planet gears the sun gear 78 is spaced from the outer surface of drive shaft intermediate portion 76 and the tapered portion 84 of flange 82 is spaced from the tapered portion 74 of drive shaft 50. An annular spacer 88 and shim 90 maintain the sun gear 78 in fixed axial position on shaft 50.

A planet carrier generally designated by the numeral 92 has a pair of annular sprockets 94 and 96 extending outwardly therefrom. The sprockets 94 and 96 mate with receiving apertures in the crawler tread 98 so that rotation of the planet carrier 92 orbits the endless crawler tread 98 therearound to thereby propel the machine. The planet carrier 92 is journaled on the drive shaft 50 and roller bearings 38 and 100 are positioned between respective bearing supports 22 and 24 and the planet carrier 92. The planet carrier 92 has inwardly extending portions 102 and three shaft receiving bores 104. One of the shaft receiving bores 104 is illustrated in detail in FIGURE 1. Nonrotatably secured in bores 104 are planetary gear supporting shafts 106 which have lubricating passageways 108 therein. Planet gear supporting shafts 106 are nonrotatably secured in bores 104 by means of a transverse pin 110. A cylindrical bushing 112 is positioned on shaft 106 and planet gear 114 is coaxially positioned on shaft 106 with bushing 112 therebetween. There are three planet gears 114, 116 and 118 carried by planet carrier 92 by means of shafts similar to shaft 106. The planet gears 114, 116 and 118 are concentrically arranged about sun gear 78 and are radially disposed relative to sun gear 78 as illustrated in FIGURE 2.

An internal toothed ring gear 120 meshes with the planet gears 114, 116 and 118 and is prevented from rotation by means of a lever 122 secured thereto by means of pins 124 and 126. The arrangement between the internally toothed ring gear 120 and lever 122 is clearly set forth in Patent #2,707,522. A pair of seal rings 128 and 130 are provided between the ring gear 120 and the planet carrier 92 to maintain lubricant within the drive mechanism 10.

To equally distribute the gear load from the sun gear to the planet gears, where the sun gear is an integral part of the drive shaft, the planet gears must be radially disposed from the drive shaft so that the path of all the planet gears about the drive shaft is a common circle having exactly the same center as the drive shaft. Any slight deviation causes the gear loading to be concentrated on one of the planet gears. This results in gear loads that may exceed design specifications and cause gear failure.

In drive mechanisms that must be assembled on the vehicle frame, it is difficult to provide the exact dimensions required for the planet gears to be equally spaced from the sun gear. Thus, a newly assembled drive mechanism may have uneven gear load distribution. The components of the drive mechanism are subject to uneven wear so that worn components may increase the gear loading. By providing a sun gear that deffects radially the accuracy previously required is reduced. The sun gear, under driving load, deflects radially relative to the drive shaft and seeks a common center with the planet gear circle to thereby equally distribute the driving force from the sun gear to all the planet gears.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. A planetary gear drive for a crawler tread comprising a frame, a drive shaft rotatably journaled in and supported adjacent its end portions by said frame, said drive shaft having an intermediate portion of reduced diameter, a sun gear having a central bore and an annular flange extending laterally therefrom, said annular flange having an internal bore with substantially the same radial dimension as said drive shaft, said sun gear central bore having a diameter larger than the diameter of said drive shaft intermediate portion, said sun gear coaxially positioned on said drive shaft between said drive shaft end portions with said sun gear central bore overlying said shaft intermediate portion and said annular flange nonrotatably securing said sun gear to said drive shaft, a planet gear carrier having end portions rotatably supported by said frame and an intermediate portion journaled on said drive shaft, a plurality of planet gears carried by said planet gear carrier intermediate portion in meshing relation with said sun gear and positioned radially of said sun gear, said planet gear carrier having sprocket means extending radially therefrom, said sprocket means adapted upon rotation of said planet gear carrier to orbit an endless crawler tread therearound, an internally toothed ring gear meshing with said planet gears, and means to hold said ring gear against rotation, said sun gear arranged during drive to deflect radially relative to said drive shaft intermediate portion to assume a position equidistant from all of said planet gears so that said sun gear drives all of said planet gears and distributes the gear load equally among all of said planet gears.

2. A planetary gear drive for a crawler tread comprising a frame, a drive shaft having a first end portion, a second end portion, an intermediate portion, a cylindrical portion having a diameter less than the diameter of said intermediate portion, and a tapered portion between said intermediate portion and said cylindrical portion, said drive shaft journaled for rotation in said frame and rotatably supported at said first end portion and adjacent said second end portion by said frame, a sun gear having a central bore and an annular flange extending laterally therefrom, said flange having an outwardly tapered portion and a cylindrical end portion, said flange cylindrical end portion having an internal bore with substantially the same diameter as said shaft intermediate portion, said flange outwardly tapered portion having an internal bore larger than said shaft tapered portion, said sun gear central bore having a diameter larger than the diameter of said shaft cylindrical portion, said sun gear coaxially positioned on said drive shaft between said first end portion and said second end portion with said sun gear central bore overlying said shaft cylindrical portion, said sun gear flange cylindrical portion overlying said shaft intermediate portion and said flange outwardly tapered portion overlying said shaft tapered portion, means nonrotatably securing said flange cylindrical end portion to said shaft intermediate portion in a manner that said sun gear is spaced axially from said shaft cylindrical portion, a planet gear carrier having end portions rotatably supported by said frame and an intermediate portion journaled on said drive shaft, a plurality of planet gears carried by said planet gear carrier in meshing relation with said sun gear and positioned radially of said sun gear in substantially the same plane within said frame, said planet gear carrier having sprocket means extending radially therefrom, said sprocket means adapted upon rotation of said planet gear carrier to orbit an endless crawler tread therearound, an internally toothed ring gear meshing with said planet gear, and means to hold said ring gear against rotation, said sun gear arranged during drive to deflect radially relative to said drive shaft cylindrical portion to assume a position equidistant from all of said planet gears so that said sun gear drives all of said planet gears and distributes the gear load equally among all of said planet gears.

3. A planetary gear drive as set forth in claim 2 in which said drive shaft is rotatably supported in said frame by means of a pair of spaced bearing supports secured to said frame, said bearing supports each having support bearings therein, said shaft extending through said bearings, means to limit longitudinal movement of said shaft in said bearing supports, and annular spacer means positioned around said shaft and between said sun gear and said bearings to limit longitudinal movement of said sun gear on said shaft.

4. A planetary gear drive as set forth in claim 2 in which said shaft intermediate portion has a plurality of spline receiving grooves formed longitudinally thereon and said sun gear flange cylindrical portion has a plurality of inwardly extending splines, said sun gear flange splines extending into said shaft spline receiving grooves to nonrotatably secure said sun gear to said shaft.

5. A planetary gear drive for a crawler tread comprising a frame having a pair of laterally spaced side walls, a pair of bearing supports positioned in said frame side walls, the drive shaft having a first end portion, a second end portion, an intermediate portion, a cylindrical portion having a diameter less than the diameter of said intermediate portion, and a tapered portion between said intermediate portion and said cylindrical portion, said drive shaft journaled for rotation in said frame and rotatably supported at said first end portion and adjacent said second end portion by said bearing supports so that said shaft intermediate portion and cylindrical portion are positioned between said frame side walls, a sun gear having a central bore and an annular flange extending laterally therefrom, said flange having an outwardly tapered portion and a cylindrical end portion, said flange cylindrical end portion having an internal bore with substantially the same diameter as said shaft intermediate portion, said flange outwardly tapered portion having an internal bore larger than said shaft tapered portion, said sun gear central bore having a diameter larger than the diameter of said cylindrical portion, said sun gear coaxially positioned on said drive shaft between said frame side walls with said sun gear central bore overlying said shaft cylindrical portion, said sun gear flange cylindrical portion overlying said shaft intermediate portion and said flange outwardly tapered portion overlying said shaft tapered portion, means nonrotatably securing said flange cylindrical end portion to said shaft intermediate portion in a manner that said sun gear is spaced axially from said shaft cylindrical portion, a planet gear carrier having end portions rotatably supported by said bearing supports so that said planet gear carrier is positioned between said frame side walls, a plurality of planet gears carried by said planet gear carrier in meshing relation with said sun gear and positioned radially on said sun gear in substantially the same vertical plane between said frame side walls, said planet gear carrier having sprocket means extending radially therefrom, said sprocket means adapted upon rotation of said planet gear carrier to orbit an endless crawler tread therearound, an internally toothed ring gear meshing with said planet gear, and means to hold said ring gear against rotation, said sun gear arranged during drive to deflect radially relative to said drive shaft cylindrical portion to assume a position equidistant from all of said planet gears so that said sun gear drives all of said planet gears and distributes the gear load equally among all of said planet gears.

References Cited in the file of this patent

UNITED STATES PATENTS

| | | |
|---|---|---|
| 2,516,077 | Schmitter | July 18, 1950 |
| 2,707,522 | Sibley | May 3, 1955 |
| 2,978,051 | Risk et al. | Apr. 4, 1961 |
| 3,090,258 | Zink et al. | May 21, 1963 |